US009869600B2

(12) United States Patent
Haldorsen (10) Patent No.: US 9,869,600 B2
(45) Date of Patent: Jan. 16, 2018

(54) PRESSURE SENSOR

(71) Applicant: Siemens Aktiengesellschaft, München (DE)

(72) Inventor: Kjetil Haldorsen, Rubbestadneset (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 86 days.

(21) Appl. No.: 14/895,007

(22) PCT Filed: Jun. 4, 2014

(86) PCT No.: PCT/EP2014/061574
§ 371 (c)(1),
(2) Date: Dec. 1, 2015

(87) PCT Pub. No.: WO2015/003856
PCT Pub. Date: Jan. 15, 2015

(65) Prior Publication Data
US 2016/0231193 A1    Aug. 11, 2016

(30) Foreign Application Priority Data

Jul. 12, 2013    (EP) .................................... 13176344

(51) Int. Cl.
*G01L 27/00*        (2006.01)
*G01L 13/02*        (2006.01)
(Continued)

(52) U.S. Cl.
CPC .......... *G01L 27/005* (2013.01); *G01L 9/0051* (2013.01); *G01L 13/02* (2013.01);
(Continued)

(58) Field of Classification Search
CPC ..... G01L 15/00; G01L 27/002; G01L 9/0072; G01L 9/065; G01L 7/02; G01L 7/08; G01L 7/022

See application file for complete search history.

(56) References Cited

U.S. PATENT DOCUMENTS 5,680,109 A    10/1997  Lowe et al.
6,023,978 A *   2/2000  Dauenhauer ............ G01L 9/045
                                                    338/42
(Continued)

OTHER PUBLICATIONS

International Search Report PCT/ISA/210 for International Application No. PCT/EP2014/061574 dated Jun. 24, 2014.
(Continued)

*Primary Examiner* — David A Rogers
(74) *Attorney, Agent, or Firm* — Harness, Dickey & Pierce, P.L.C.

(57) ABSTRACT

A pressure sensor is provided. The pressure sensor has a differential pressure sensor adapted to measure differential pressure between two differential pressure sensor inputs in a first differential pressure range. The pressure sensor further includes a first absolute pressure sensor and a second absolute pressure sensor adapted to measure an absolute pressure in an absolute pressure range. The pressured sensor is further provided with a measuring unit configured to determine a differential pressure in a second differential pressure range on the basis of absolute pressure measurements taken by the first and second absolute pressure sensors.

21 Claims, 5 Drawing Sheets

(51) Int. Cl.
*G01L 15/00* (2006.01)
*G01L 9/00* (2006.01)

(52) U.S. Cl.
CPC .......... *G01L 13/025* (2013.01); *G01L 15/00* (2013.01); *G01L 27/002* (2013.01)

(56) References Cited

U.S. PATENT DOCUMENTS

| | | | | |
|---|---|---|---|---|
| 6,973,818 B2 * | 12/2005 | Silvis | ................ | G01M 15/102 73/1.02 |
| 7,467,555 B2 * | 12/2008 | Schulte | ................ | G01F 1/34 73/736 |
| 8,132,464 B2 * | 3/2012 | Broden | ................ | G01F 1/383 73/716 |
| 8,234,927 B2 * | 8/2012 | Schulte | ................ | G01L 9/0072 73/718 |
| 8,276,458 B2 * | 10/2012 | Hedtke | ................ | G01D 3/02 73/717 |
| 8,327,713 B2 * | 12/2012 | Willcox | ................ | G01L 9/0029 73/700 |
| 2008/0006094 A1 * | 1/2008 | Schulte | ................ | G01F 1/34 73/736 |
| 2011/0247421 A1 * | 10/2011 | Tokuda | ................ | G01L 9/0054 73/716 |
| 2012/0001278 A1 * | 1/2012 | Ooya | ................ | G01L 9/0054 257/419 |
| 2012/0006119 A1 | 1/2012 | Broden et al. | | |
| 2012/0073377 A1 * | 3/2012 | Kurtz | ................ | G01L 9/0052 73/708 |
| 2012/0079876 A1 * | 4/2012 | Stroock | ................ | G01N 13/02 73/64.51 |
| 2013/0289898 A1 * | 10/2013 | Lemense | ................ | B60C 23/0474 702/50 |
| 2014/0102209 A1 * | 4/2014 | Kurtz | ................ | G01L 9/0052 73/753 |
| 2016/0153815 A1 * | 6/2016 | Van Der Wiel | ................ | B81B 7/04 73/861.42 |

OTHER PUBLICATIONS

Written Opinion of the International Searching Authority PCT/ISA/237 for International Application No. PCT/EP2014/061574 dated Jun. 24, 2014.

\* cited by examiner

PRESSURE SENSOR

PRIORITY STATEMENT

This application is the national phase under 35 U.S.C. §371 of PCT International Application No. PCT/EP2014/061574 which has an International filing date of Jun. 4, 2014, which designated the United States of America and which claims priority to European patent application number EP13176344.3 filed Jul. 12, 2013, the entire contents of which are hereby incorporated herein by reference.

FIELD

The present invention generally relates to a pressure sensor and/or to a method of measuring differential pressure.

BACKGROUND

Several applications are known to benefit from the measurement of a differential pressure. One example is a choke valve of a Christmas tree of a subsea wellhead assembly. The differential pressure across the valve can for example be monitored when closing the valve so as to obtain information about the functionality and the operability of the valve. Another application includes filter systems, in which the differential pressure across for example a filtration membrane can give an indication of the flow through the membrane and thus indicate clogging of the membrane.

Differential pressure (DP) sensors are known which measure the pressure difference between a first and a second input. As an example, in such differential pressure sensor, the pressure on each of the two inputs may be supplied to different sides of a membrane or diaphragm. If the pressure on both inputs is the same, then the diaphragm will essentially remain in an equilibrium position. Should the pressure on one input increase or decrease, the diaphragm will undergo a corresponding deformation or displacement which can be detected, for example by way of a strain sensor, capacitive detection, detection by piezo crystals or the like. The differential pressure sensor thus measures a differential pressure across the two inputs, irrespective of the absolute pressure at each input. Differential pressure sensors are generally suitable only for a limited range of differential pressures.

Furthermore, absolute pressure sensors are known which detect an absolute pressure value. Again, such absolute pressure sensor may be realized by a diaphragm and a strain sensor, with a vacuum, atmospheric pressure or any other desirable but fixed pressure prevailing at the other side of the diaphragm. Absolute pressure sensors can be capable of measuring pressures through a large pressure range. Yet such absolute pressure sensors suffer from drift, and are generally less accurate.

It is desirable to provide accurate pressure measurements over wide range of differential pressures. Furthermore, it is desirable to provide a pressure sensor with a long lifetime which is capable of giving accurate readings of differential pressure over the course of its life. It is also desirable to provide a compact pressure sensor that is suitable for subsea use.

SUMMARY

Accordingly, the inventors have recognized that there is a need for an improved pressure sensor that obviates at least some of the drawbacks mentioned above. In particular, the inventors have recognized that there is a need for a pressure sensor which is capable of measuring relatively high differential pressures with high accuracy.

This need is met by the features of the independent claims. The dependent claims describe embodiments of the invention.

An embodiment of the invention provides a pressure sensor comprising a differential pressure sensor adapted to measure differential pressure between two differential pressure sensor inputs in a first differential pressure range. It further comprises a first absolute pressure sensor and a second absolute pressure sensor adapted to measure an absolute pressure in an absolute pressure range. A measuring unit is further provided which is configured to determine a differential pressure in a second differential pressure range on the basis of absolute pressure measurements taken by the first and second absolute pressure sensors. The first and second absolute pressure sensors are configured to have an absolute pressure range such that the second differential pressure range extends to higher differential pressures than the first differential pressure range.

A further embodiment of the invention provides a method of measuring differential pressure. The method comprises measuring differential pressure via a differential pressure sensor in a first range of differential pressure; and, in a second range of differential pressure higher than the first range, determining differential pressure on the basis of absolute pressure measurements taken by use of a first absolute pressure sensor and a second absolute pressure sensor. With such method, advantages similar to the ones outlined further above with respect to the pressure sensor may be achieved.

It is to be understood that the features mentioned above and those yet to be explained below can not only be used in the respective combinations indicated, but also in other combinations or in isolation without leaving the scope of the present invention. In particular, the method of measuring differential pressure may be performed by way of the pressure sensor or the pressure sensor assembly in any of the above outlined configurations.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

DETAILED DESCRIPTION OF EXAMPLE EMBODIMENTS

An embodiment of the invention provides a pressure sensor comprising a differential pressure sensor adapted to measure differential pressure between two differential pressure sensor inputs in a first differential pressure range. It further comprises a first absolute pressure sensor and a second absolute pressure sensor adapted to measure an absolute pressure in an absolute pressure range. A measuring unit is further provided which is configured to determine a differential pressure in a second differential pressure range on the basis of absolute pressure measurements taken by the first and second absolute pressure sensors. The first and second absolute pressure sensors are configured to have an absolute pressure range such that the second differential pressure range extends to higher differential pressures than the first differential pressure range.

In such configuration, the measurement of differential pressures lying above the first differential pressure range may be enabled. In particular, the first and second absolute pressure sensors may cover an absolute pressure range which significantly exceeds the first differential pressure range. This will result in a second differential pressure range the upper limit of which also significantly exceeds the upper limit of the first differential pressure range. At lower differential pressures, the differential pressure (DP) sensor can be used to take measurements with high accuracy. In the second differential pressure range, higher pressure differences are measured, so that a lower accuracy of the absolute measurements does not have such high impact, so that a differential pressure can be determined from the absolute measurements with relatively high accuracy.

In an embodiment, the pressure sensor further comprises a calibration unit which is configured to calibrate the determination of the differential pressure by the measuring unit. The calibration is based on a differential pressure measurement taken by the differential pressure sensor. Accordingly, even if the absolute pressure measurements taken by the absolute pressure sensors may become more inaccurate over time, e.g. due to a sensor drift, these inaccuracies can be corrected by using a calibration based on the differential pressure measurement. The differential pressure measurement taken by the DP sensor generally has high accuracy and, due to the nature of differential measurements, does not suffer from drift. Thus, the accuracy of the differential pressure determined from the absolute pressure measurements can be improved, and may furthermore be held over the lifetime of the pressure sensor.

In particular, the calibration unit may be configured to compensate sensor drift of the first absolute pressure sensor and of the second absolute pressure sensor. Such sensor drift may even accumulate, for example if the absolute pressure measurements by the first and second sensors drift in different directions. Accordingly, correcting for sensor drift by way of the calibration unit may improve the accuracy of the determined differential pressure significantly.

The differential pressure sensor may take the measurement for calibrating the differential pressure determination (done by the measuring unit on the basis of the absolute pressure measurements) at a differential pressure at or below 50 bar, preferably at or below 30 bar, more preferably at or below 10 bar. At these differential pressures, the differential pressure sensor generally operates with high accuracy and can thus provide accurate data for calibration. The differential pressure may for example lie within a range of 0 to 5 bar when taking the differential pressure measurement for calibration.

In an embodiment, the upper limit of the first differential pressure range may be below 50 bar, preferably below 40 bar and more preferably below 35 bar. The first differential pressure range may for example be a range from about 0 to about 35 bar, from about 0 to about 30 bar or from about 0 to about 5 bar. The first differential pressure range may be configured in dependence on the particular application and on the type of differential pressure sensor. High accuracy readings can thus be obtained over this first differential pressure range.

In an embodiment, the upper limit of the second differential pressure range may be above 100 bar, preferably above 500 bar and more preferably above 900 bar. As an example, the second differential pressure range may be a range of about 0 to about 500 bar or of about 0 to about 1,000 bar. Thus, by deriving a differential pressure from the absolute pressure measurements, the range of the pressure sensor can be extended significantly at relatively high accuracy.

Note that any combinations of the pressure limits and ranges of the first differential pressure range and the second differential pressure range are conceivable and are considered to be disclosed herein.

In the areas where the first and second ranges of differential pressure overlap, readings may be taken from the differential pressure sensor, and the readings can be used for calibrating the determination of differential pressure from the absolute pressure measurements. Calibration may be performed by comparing the determined differential pressure with the measured differential pressure and determining a calibration factor.

In an embodiment, the measuring unit is further adapted to adjust the measurement of differential pressure by the differential pressure sensor on the basis of an absolute pressure measured by the first and/or second absolute pressure sensor. As an example, the differential pressure sensor may have different operating characteristics for different absolute pressures. Accordingly, by adjusting the measured differential pressure in accordance with the absolute pressure, the accuracy of the differential pressure measurement by the DP sensor may be improved.

In an embodiment, the pressure sensor further comprises a first pressure inlet for transmitting a first pressure at a first inlet position to the first absolute pressure sensor and to a differential pressure sensor input. It further comprises a second pressure inlet for transmitting a pressure at a second inlet position to the second absolute pressure sensor and to the other differential pressure sensor input. The first inlet position is spaced apart from the second inlet position. Accordingly, only two pressure inlets are required for taking absolute pressure measurements by the two absolute pressure sensors and for taking differential pressure measurements by the DP sensor. The accuracy of the differential pressure measurements can further be improved by using only two pressure inlets.

In an embodiment, the first pressure inlet is arrangeable or arranged at one side of an element selected from the group comprising a valve, a flow constriction, a filter element, a screen or a membrane. The second pressure inlet is arrangeable or arranged at the other side of this element. The pressure sensor may thus be used to accurately log the pressure drop across a valve, for example when closing the valve, or across a filter element or flow constriction, e.g. for flow velocity measurements or a flow meter application. Due to the extended range which can be achieved by the additional absolute pressure measurements, the differential pressure may be monitored over the whole travelling range of the valve (e.g. from fully opened to fully closed). This is generally not possible with conventional differential pressure sensors.

In an embodiment, the differential pressure sensor comprises a differential pressure sensor element and a protection mechanism which is configured such that a differential pressure above the first pressure range is not transmitted to the sensor element. Accordingly, even if the pressure sensor including the DP sensor is used to measure large pressure differences, it may be prevented that the sensor element of the DP sensor is damaged. The configuration of the DP sensor may generally be such that the pressure received at the first input and the second input of the DP sensor is applied across the sensor element (e.g. applied to two different positions or two sides of a diaphragm, membrane or another flexible element or the like).

In an embodiment, the DP sensor may for example comprise a chamber which is in flow communication with the first pressure inlet. The chamber may be closed by a first diaphragm, which deforms upon application of pressure to the first pressure inlet. The diaphragm may on its other side be in contact with a working fluid (or fill fluid) of the DP sensor. The pressure may then, via the working fluid, be transmitted to the sensor element. Since the diaphragm separates the working fluid from the process fluid, it may also be termed isolating diaphragm. A diaphragm seat may be provided to limit the possible deformation of the diaphragm and thus the transmission of pressure from the pressure inlet to the working fluid. For the second pressure inlet, the DP sensor may be configured correspondingly, i.e. with a second chamber, a second diaphragm and a second working fluid. The first and second working fluids may then apply the differential pressure across the sensor element.

A protection diaphragm may be provided and may separate the first and second working fluids. The protection diaphragm can be configured such that is deformed upon a differential pressure between the first and second working fluids exceeding a pressure threshold. Upon such deformation, the corresponding volume change in the first or second working fluid will cause the diaphragm to which the higher pressure is applied to come into contact with the diaphragm seat, thereby preventing the application of higher pressures to the respective working fluid. The differential pressure of the two working fluids can thus not exceed the pressure threshold. A robust and accurate differential pressure sensor can thus be provided for the first differential pressure range. The differential pressure sensor can be operated at higher differential pressures without taking damage, although it will not give any further readings. Yet this is not required, since the differential pressure can be determined on the basis of the absolute pressure measurements by the absolute pressure sensors.

The chamber of the DP sensor may for example be formed by a cover (also termed process cover or pressure lid) and the diaphragm (e.g. isolating diaphragm), the chamber being in flow connection with the pressure inlet. The chamber may furthermore be in flow connection with the respective absolute pressure sensor.

Sensing techniques that may be employed with the differential pressure sensor include electromechanical strain gauge, variable capacitance, variable reluctance and piezoresistive techniques.

In an embodiment, the first and/or the second absolute pressure sensor comprises a strain sensor coupled to a diaphragm as a sensor element for absolute pressure measurements. A robust configuration of the absolute pressure sensors can thus be achieved, and relatively high absolute pressures can be measured.

In an embodiment, the pressure sensor is a subsea pressure sensor. The subsea pressure sensor may for example comprise a subsea enclosure housing the differential pressure sensor and the first and second absolute pressure sensors. The enclosure may in some embodiments furthermore house the measuring unit and/or may house the above mentioned calibration unit. The enclosure may be a pressure resistant enclosure having an internal pressure below 5 bar, preferably below 2 bar, preferably about or below 1.5 bar. Furthermore, an electrical connector or penetrator may be provided in the enclosure for electrically connecting the subsea pressure sensor.

In other embodiments, a pressure compensated housing may be provided. In such embodiments, the first and second absolute pressure sensors may each comprise a chamber in which a predetermined pressure prevails, for example a pressure below 5 bar, below 2 bar or preferably below 1.5 bar. Such chamber may serve as a reference for absolute pressure measurements, it may for example be in flow communication with a backside of a diaphragm or another deformable element of the absolute pressure sensor.

A further embodiment of the present invention provides a pressure sensor assembly for measuring a pressure difference between a pressure at a first position and a pressure at a second position. The pressure sensor assembly comprises a pressure sensor in any of the above outlined configurations. It further comprises a first section of piping providing a flow connection from the first position to a differential pressure sensor input and to the first absolute pressure sensor. It further comprises a second section of piping providing a flow connection from the second position to the other differential pressure sensor input and to the second absolute pressure sensor.

In an embodiment, the pressure sensor assembly may further comprise a valve adapted to control the flow of a fluid through a duct. The first section of piping may be connected to the duct in a pressure communicating manner on one side of the valve and the second section of piping may be connected to the duct in a pressure communicating manner on the other side of the valve. The differential pressure across the valve may in such configuration be measured with high accuracy, and it may furthermore be measured over the full range of the valve. In particular in an oil and gas application, for example when used as a choke valve on a Christmas tree, in particular on a subsea Christmas tree, pressure differences of several hundred bars may prevail across such valves. The use of the pressure sensor assembly according to embodiments disclosed herein is thus particularly beneficial in such applications.

In an embodiment, the pressure sensor assembly may further comprise a printed circuit board (PCB) comprising a processing unit implementing the above outlined measuring unit and/or calibration unit. Accordingly, the differential pressure may be directly derived from the absolute pressure measurements within the pressure sensor assembly. In other embodiments, the raw data, i.e. the readings of the differential pressure sensor and of the first and second absolute pressure sensors may be directly transmitted/communicated to a (remote) processing unit, such as a processing unit on a topside or land-based installation, at which the above mentioned measuring unit and/or calibration unit are implemented.

A further embodiment of the invention provides a method of measuring differential pressure. The method comprises measuring differential pressure via a differential pressure sensor in a first range of differential pressure; and, in a second range of differential pressure higher than the first range, determining differential pressure on the basis of absolute pressure measurements taken by use of a first absolute pressure sensor and a second absolute pressure sensor. With such method, advantages similar to the ones outlined further above with respect to the pressure sensor may be achieved.

In an embodiment, the method further comprises the steps of taking a differential pressure measurement in the first range by use of the differential pressure sensor and calibrating the determination of differential pressure in the second range by way of the differential pressure measurement taken in the first range. The accuracy of the differential pressure determination may thus be improved, and drift of the absolute differential pressure sensors may be eliminated.

In an embodiment, the method further comprises the step of closing a valve, in particular a choke valve, and taking differential pressure measurements within the first differential pressure range and the second differential pressure range. The measurements can be taken at an upstream side of the valve and at a downstream side of the valve so as to obtain the differential pressure across the valve.

It is to be understood that the features mentioned above and those yet to be explained below can not only be used in the respective combinations indicated, but also in other combinations or in isolation without leaving the scope of the present invention. In particular, the method of measuring differential pressure may be performed by way of the pressure sensor or the pressure sensor assembly in any of the above outlined configurations.

In the following, embodiments of the invention will be described in detail with reference to the accompanying drawings. It is to be understood that the following description of the embodiments is given only for the purpose of illustration and is not to be taken in a limiting sense. The drawings are to be regarded as being schematic representations only, and elements in the drawings are not necessarily to scale with each other. Rather, the representation of the various elements is chosen such that their function and general purpose become apparent to a person skilled in the art.

Figure 1:
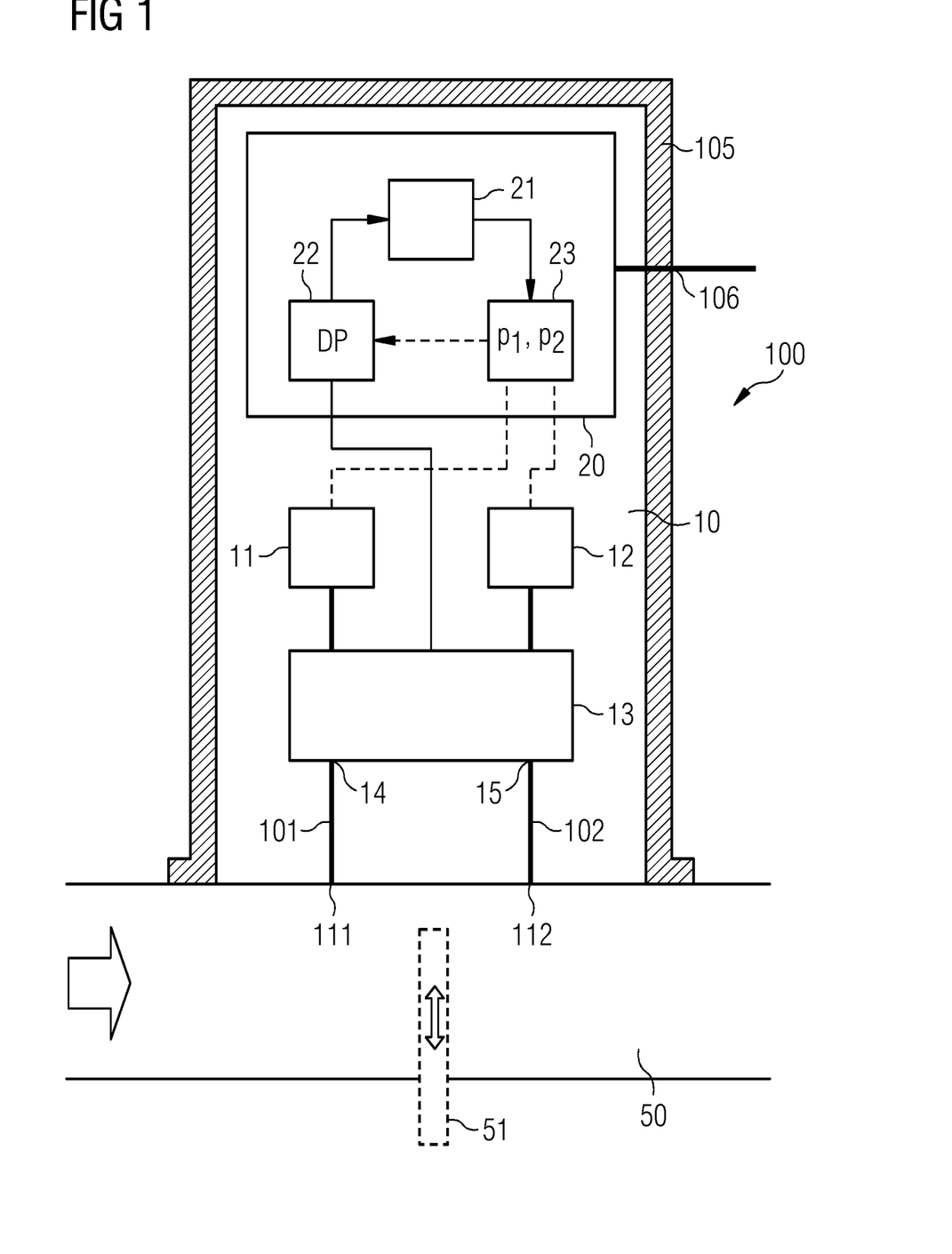
FIG. 1 shows a schematic block diagram of a pressure sensor according to an embodiment of the invention.

FIG. 1 is a schematic diagram showing a pressure sensor assembly 100, which is in particular a subsea pressure sensor assembly for the subsea detection of differential pressure. The pressure sensor assembly 100 comprises a pressure sensor 10 mounted inside a subsea enclosure 105. An electrical through connection 106 through the subsea enclosure 105 is provided for electrically contacting the pressure sensor 10. The electrical through connection 106 can be implemented in different ways, for example as an electrical penetrator which leads a conductor through the subsea enclosure 105, or as an electrical connector wherein one part of the connector is mounted to the subsea enclosure 105 and the other part of the connector can be engaged for establishing an electrical connection. In some embodiments, the subsea enclosure 105 can be a pressure resistant enclosure, i.e. an enclosure which maintains a predefined internal pressure even when the subsea pressure sensor assembly 100 is installed at a subsea location. In other embodiments, it may be a pressure compensated enclosure in which the pressure internal to the enclosure 105 is balanced to the pressure in the surrounding seawater via a volume or pressure compensator.

In the example of FIG. 1, the subsea pressure sensor assembly 100 is mounted to a duct 50, in which a fluid flows, as indicated by the arrow. The fluid may be a liquid, but it may in other applications also be a multiphase flow comprising liquid, gas and/or solid components. In the example application of FIG. 1, a valve 51 is provided which can be closed to reduce or stop the fluid flow. This may for example be a choke valve on a subsea Christmas tree. Subsea pressure sensor assembly 100 is provided for measuring the differential pressure across the valve 51. Note that this is only an example application; other applications for measuring differential pressure are certainly conceivable, such as measuring differential pressure across a filtration unit, such as a membrane, a screen or the like, across a flow constriction (for example in a flow meter application), across different types of valves and the like.

The pressure sensor 10 comprises a differential pressure sensor (DP sensor) 13 which has a first DP sensor input 14 and a second DP sensor input 15. The DP sensor 13 is adapted to perform a differential pressure measurement of the difference of the pressures applied at the inputs 14 and 15. As an example, both pressures can be transmitted, e.g. via a working fluid, to the two different sides of sensing element such as a diaphragm or another flexible element. In case that the pressures at both DP sensor inputs 14 and 15 are equal, the flexible element will remain in an equilibrium position and will thus indicate a differential pressure of zero. When the pressure on one of the inputs 14 and 15 is increased (or correspondingly, if the pressure on the other input is decreased), then the forces acting on the flexible element from both sides are no longer equal and the flexible element will deform correspondingly. For example by way of a strain sensor, a capacitive sensor, or a piezoresistive sensor, this deformation can be measured, leading to a signal which is proportional to the differential pressure across the flexible element. Note that these are only examples given for the purpose of illustrating the general function of a differential pressure sensor, and that any other known configuration of a differential pressure sensor may be used with embodiments of the pressure sensor 10.

As can be seen from this description, the DP sensor 13 measures differential pressure across its inputs 14 and 15, wherein the measurement is relatively independent on the absolute pressure which is present on the inputs 14 and 15 (since it measures only a difference between the inputs). The DP sensor 13 in such configuration is operable in a first differential pressure range, in which it can measure differential pressure with high accuracy. In order to prevent damage to the DP sensor 13 upon the application of higher differential pressures, a protection mechanism is provided which limits the measurement range of DP sensor 13. As an example, DP sensor 13 may be configured to measure differential pressures within a range having an upper limit below 50 bar. Such pressure range may for example be from about 0 to about 35 or 30 bar, or in other embodiments from about 0 to about 5 bar. This will depend on the particular implementation of the DP sensor 13. Note that these pressure ranges are only given for the purpose of illustration, and that other embodiments may use DP sensors 13 having other operating ranges, for example ranging to 100 bar or above.

Pressure sensor 10 further comprises a first absolute pressure sensor 11 and a second absolute pressure sensor 12. Pressure on one side of the valve 51 is transmitted from a first pressure inlet 111 to both the first DP sensor input 14 and to the first absolute pressure sensor 11. Similarly, pressure on the other side of valve 51 is transmitted via a second pressure inlet 112 to the second DP sensor input 15 and to the second absolute pressure sensor 12. Accordingly, the differential pressure is measured via DP sensor 13 at the same positions at which the absolute pressure is measured by the absolute pressure sensors 11 and 12. The pressure can for example be transmitted via sections of piping 101 and 102, as illustrated in FIG. 1.

By way of the absolute pressure sensors 11 and 12, it is possible to measure the absolute pressure in the fluid flow through duct 50 on either side of the valve 51 or of any other element for which subsea pressure sensor assembly 100 is used to measure differential pressure. Absolute pressure sensors 11 and 12 are configured to measure absolute pressure within a range the upper limit of which exceeds the upper limit of the differential pressure range for which DP sensor is configured. As an example, the upper limit of the absolute pressure range of sensors 11 and 12 may be equal or exceed 100, 500 or even 900 bar. Absolute pressure sensors 11 and 12 may for example be configured to measure absolute pressure in a range from 0 or 1 to about 500 or about 1,000 bar.

From the two absolute pressure measurements taken by sensors 11 and 12, it is possible to derive a differential pressure across valve 51. For this purpose, a measuring unit is provided. Since the range in which absolute pressure can be measured exceeds significantly the differential pressure range of DP sensor 13, the sensors 11 and 12 enable differential pressure determination within a second differential pressure range exceeding the first differential pressure range of DP sensor 13. The second differential pressure range may for example be from about 0 to about 500 bar or even from about 0 to about 1,000 bar. Accordingly, even if the valve 51 is closed completely, and if the pressure across the valve 51 is on the order of several hundred bar, the differential pressure can be picked up via absolute pressure sensors 11 and 12, with DP sensor 13 being out of range.

In the embodiment of FIG. 1, the measuring unit 20 performs the measurement and evaluation of the differential pressures and of the absolute pressures by use of sensors 11, and 13. Functional unit 22 measures the differential pressure from DP sensor 13, whereas functional unit 23 measures absolute pressure from absolute pressure sensors 11 and 12 and determines a differential pressure based on the absolute values (e.g. by calculating a difference between the measured absolute pressure values).

Absolute pressure sensors 11 and 12 may have a limited accuracy and may suffer from drift over the lifetime of the subsea pressure sensor assembly 100, which can be up to or may even exceed 25 years. To ensure an accurate determination of differential pressure even in the higher, second DP range, the measuring unit 20 further comprises a calibration unit 21. When the pressure across the valve 51 is within the first DP range, e.g. below 30 bar or below 5 bar, a DP calibration measurement is taken by the DP sensor 13. Calibration unit 21 uses this calibration measurement to calibrate the determination of differential pressure by unit 23. As an example, an absolute pressure measurement is performed by the sensors 11 and 12 simultaneously or subsequently to the calibration measurement, and the differential pressure is determined by unit 23 on the basis of these absolute pressure measurements. The determined differential pressure is then compared with the calibration measurement to determine calibration factors or parameters for DP determination by unit 23. Accordingly, even if the absolute pressure sensors 11 and 12 drift in different directions over the course of their life, which would lead to a significant error in the DP determination by unit 23, this can be accounted for by the calibration. Pressure sensor 10 is thus capable of measuring differential pressure within the second DP range with high accuracy over its lifetime.

Note that different types of absolute pressure sensors and 12 can be used. Some absolute pressure sensors may measure pressure relative to vacuum, while others may measure relative to an atmospheric pressure or to another predetermined pressure. As can be taken from the above description, any type of such absolute pressure sensor can be used in the pressure sensor 10, since the difference between the measurements of these absolute pressure sensors 11 and 12 is taken and is the quantity of interest for the applications outlined herein.

Figure 2:
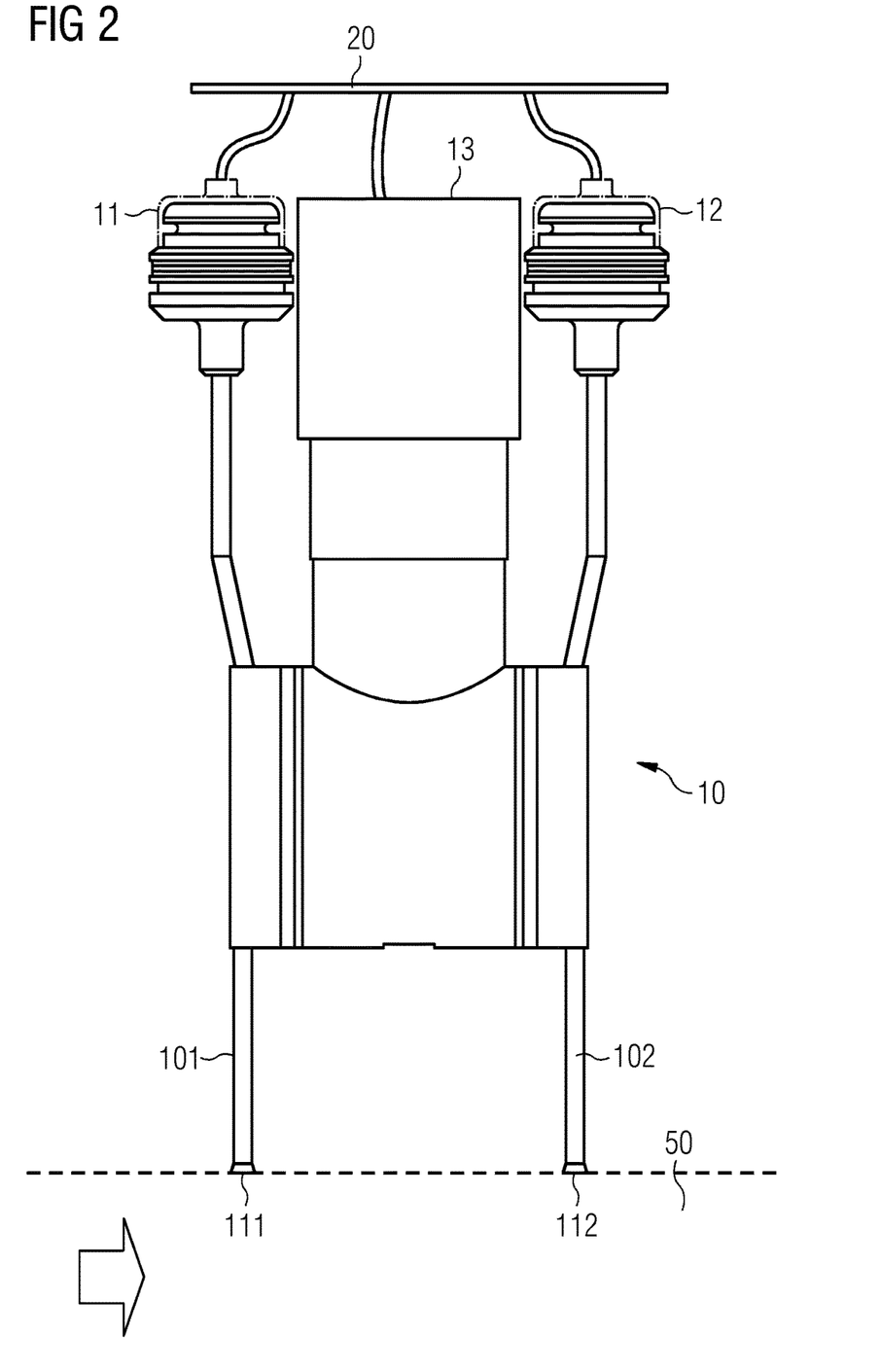
FIG. 2 is a schematic diagram showing a side view of a particular implementation of the pressure sensor of FIG. 1 according to an embodiment of the invention.

FIG. 2 shows a particular implementation of the pressure sensor 10 of FIG. 1. Accordingly, the explanations given above with respect to FIG. 1 are equally applicable to the embodiment illustrated in FIG. 2. In the example of FIG. 2, the measuring unit 20 is implemented in form of a printed circuit board (PCB) which comprises electric and electronic components for performing the differential pressure determination and calibration. A microprocessor may for example be provided on such PCB for performing these functions. As can be seen, electrical connections are provided to the absolute pressure sensors 11 and 12 and to the differential pressure sensor 13. These electrical connections can be used for providing the respective sensors with electric power and for receiving a measurement signal from these sensors. The sections of piping 101 and 102 are furthermore illustrated which transmit the pressure from the pressure inlets 111 and 112 respectively, to the inputs of the DP sensor 13.

Figure 3:
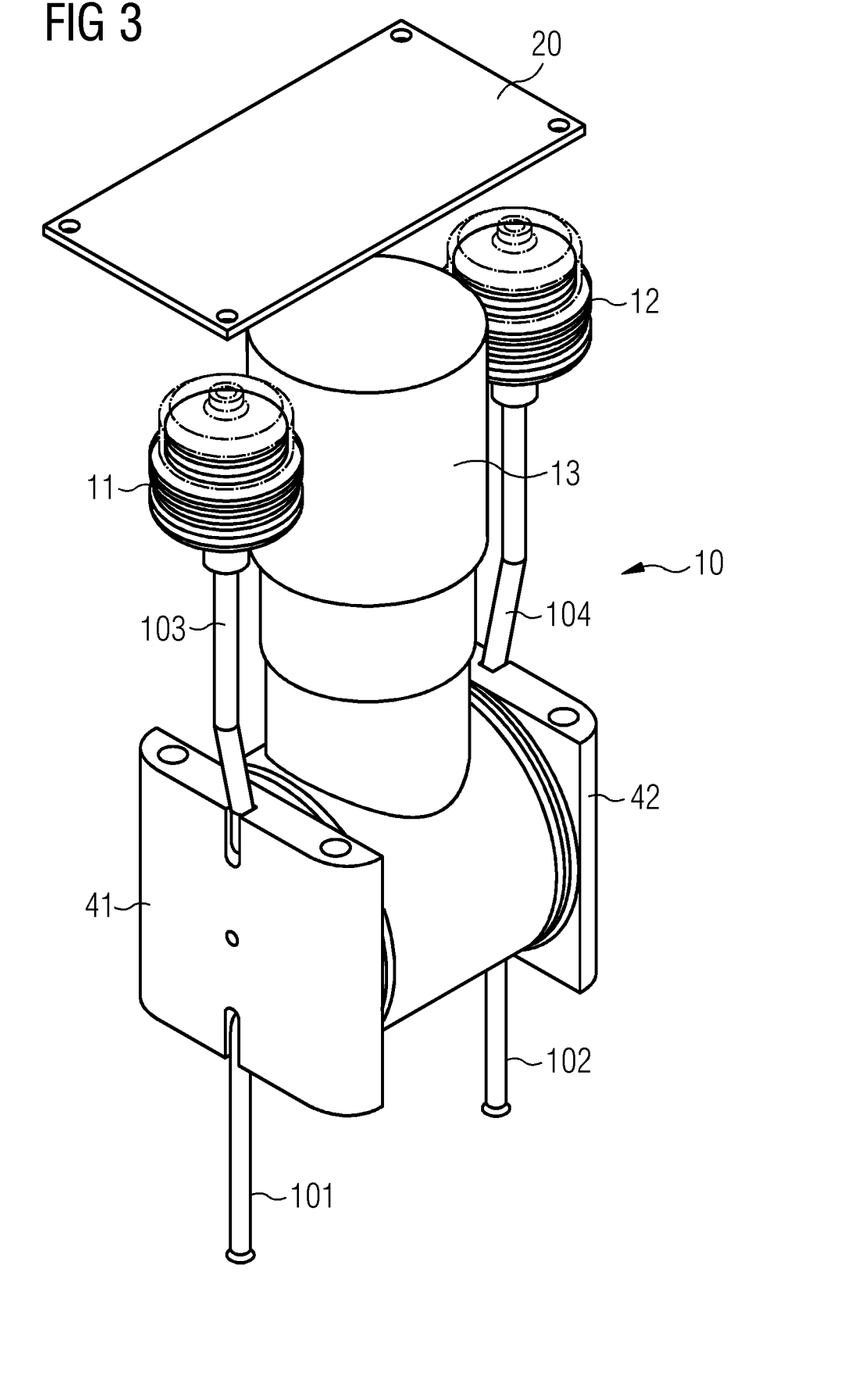
FIG. 3 is a schematic diagram showing a perspective view of the pressure sensor of FIG. 2 according to an embodiment of the invention.

FIG. 3 shows a perspective view of the pressure sensor 10. The electrical connections between the measuring unit 20 and the pressure sensors are omitted for the purpose of a comprehensive presentation. The DP sensor 13 comprises a first and a second process cover 41 and 42 (also termed pressure lid). A lower section of the DP sensor 13 comprises two diaphragms, each being covered by one of the process covers 41 and 42. A chamber is thus formed into which the pressure is transmitted via the pipe sections 101 and 102. Out of this chamber, the pressure is further transmitted via the pipe sections 103 and 104 to the first and second absolute pressure sensors 11 and 12. In such configuration, it can be ensured that the DP sensor 13 and the absolute pressure sensors 11 and 12 experience the same differential pressure.

Figure 4:
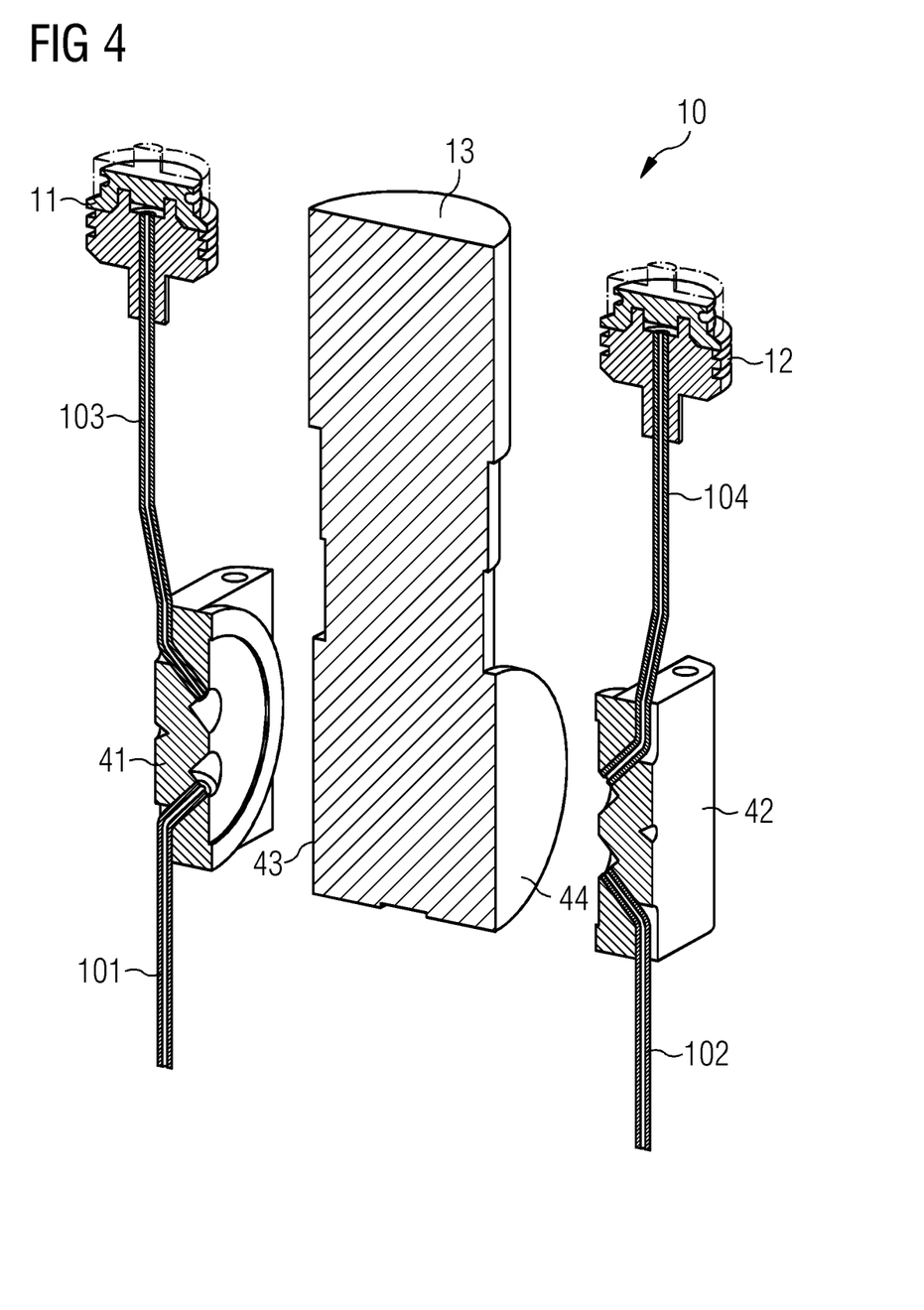
FIG. 4 is a schematic diagram showing a perspective sectional view of the pressure sensor of FIG. 3 in a partially disassembled state.

FIG. 4 is a partly disassembled and sectional view of the pressure sensor 10. The channels in the process covers and 42 are illustrated. Pressure transmitted though the sections of piping 101 and 102 are applied to the diaphragms 43 and 44. Each of these diaphragms transmits the pressure to a working fluid internal to the DP sensor 13. These two working fluids inside DP sensor 13 apply the pressure across a sensor element (not shown), which, as explained above, may comprise a flexible element and a strain sensor or other type of sensor for measuring the differential pressure between these two working fluids. Furthermore, a protection diaphragm may be provided which deforms upon the differential pressure between the two working fluids exceeding a predetermining threshold. The deformation of this protection diaphragm may then cause the respective diaphragm 43 or 44 to contact a diaphragm seat to prevent any further deformation of the respective diaphragm 43 or 44, thereby preventing the application of higher pressures to the respective working fluid. The differential pressure across the sensor element of DP sensor 13 can thus be efficiently limited.

Figure 5:
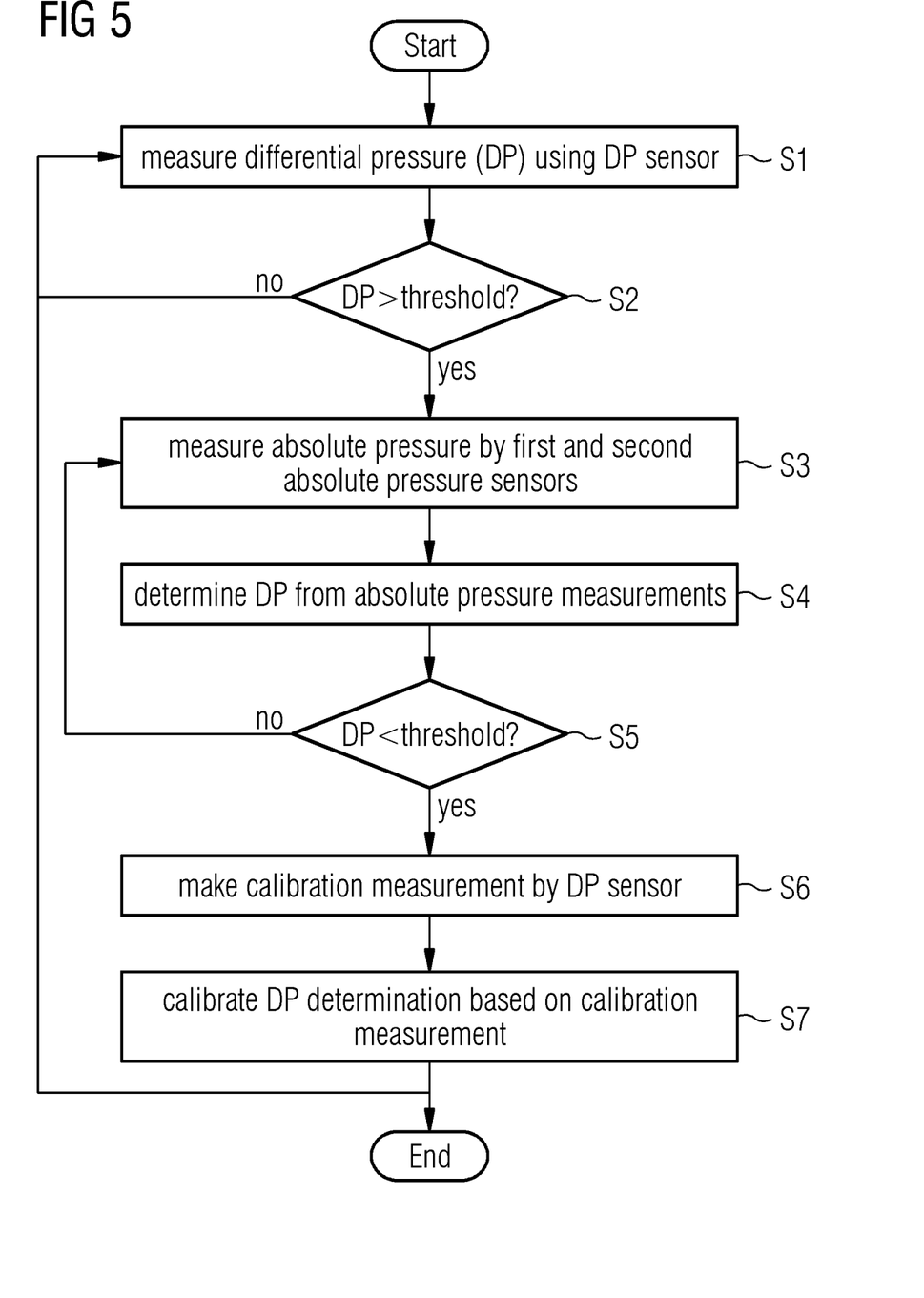
FIG. 5 shows a flow diagram of a method according to an embodiment of the invention.

FIG. 5 shows a flow diagram of a method according to an embodiment of the invention. In step S1, differential pressure is measured using the DP sensor 13, for example in a situation in which the valve 51 is fully opened. The measurements continue when closing the valve 51 to obtain a performance curve of the valve. If in decision step S2, the differential pressure measured by DP sensor 13 is still below a first threshold, the method continues with the measurement of DP by the DP sensor 13. If in the decision step S2, the first threshold is exceeded, the method continues with step S3 in which the absolute pressure sensors 11 and 12 are used to measure absolute pressure. In step S4, a differential pressure is determined from the absolute pressure measurements via measuring unit 20. As long as the determined differential pressure does not drop below a second pressure threshold, which may be equal or different to the first pressure threshold, the method continues with steps S3 and S4 for determining differential pressure (decision step S5). If in decision step S5, it is determined that the determined DP has dropped below the second threshold, then a DP measurement is taken by the DP sensor 13 as a calibration measurement. In step S7, this calibration measurement is used to calibrate the DP determination in step S4 which is based on the absolute pressure measurements by the first and second absolute pressure sensors 11 and 12. The method can continue with the measurement of differential pressures via the DP sensor 13 (step S1). The method may end any time measurements are no longer required, e.g. when the valve 51 is fully opened or fully closed, or when the measurement is automatically or manually stopped.

It should be clear that the calibration measurement can be taken at different points in time, for example periodically, or upon the occurrence of a certain event, e.g. the differential pressure across the element dropping to within the first differential pressure range, or below the second DP threshold. When closing the valve 51, the method may thus start with taking DP measurements by DP sensor 13 and, upon reaching the first threshold, continue with taking measurements by absolute pressure sensors 11 and 12, until the valve is fully closed. When opening the valve, the pressure will generally still be above the second threshold, so measurements are taken with absolute pressure sensors 11 and 12. As soon as the differential pressure drops below the second DP threshold, the DP sensor 13 is again used for DP measurements. At this point in time, the calibration measurement can be performed.

As can be seen, the two absolute pressure sensors can be used to extend the range of the DP measurements significantly, e.g. up to or even beyond 1,000 bar. The pressure sensor 10 can be used in different applications, such as valves, in particular choke valves, filters, flow restrictions and other applications. Pressure sensor 10 may be used to measure the performance curve of such valve, by measuring DP over time when the valve is closing. Such curve may then be used to conclude the operating characteristics of the valve, for example for failure detection. Another application is measuring DP over a filter, for example to detect clogging of the filter.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A pressure sensor, comprising:
   a differential pressure sensor adapted to measure differential pressure between two differential pressure sensor inputs in a first differential pressure range;
   a first absolute pressure sensor and a second absolute pressure sensor adapted to measure an absolute pressure in an absolute pressure range; and
   a measuring unit configured to determine a differential pressure in a second differential pressure range on the basis of absolute pressure measurements taken by the first and second absolute pressure sensors, wherein the first and second absolute pressure sensors are configured to have an absolute pressure range such that the second differential pressure range extends to relatively higher pressures than the first differential pressure range, wherein the differential pressure sensor comprises a differential pressure sensor element and a protection mechanism configured such that a differential pressure above the first pressure range is not transmitted to the sensor element.

2. The pressure sensor of claim 1, further comprising:
   a calibration unit configured to calibrate the determination of the differential pressure by the measuring unit, the calibration being based on a differential pressure measurement taken by the differential pressure sensor.

3. The pressure sensor of claim 2, wherein the calibration unit is configured to compensate sensor drift of the first absolute pressure sensor and the second absolute pressure sensor.

4. The pressure sensor of claim 2, wherein the differential pressure measurement for calibrating the differential pressure determination is taken by the differential pressure sensor at a differential pressure at or below 50 bar.

5. The pressure sensor of claim 4, wherein the differential pressure measurement is taken by the differential pressure sensor at a differential pressure at or below 10 bar.

6. The pressure sensor of claim 1, wherein the upper limit of the first differential pressure range is below 50 bar.

7. The pressure sensor of claim 6, wherein the upper limit of the first differential pressure range is below 40 bar.

8. The pressure sensor of claim 7, wherein the upper limit of the first differential pressure range is below 30 bar.

9. The pressure sensor of claim 1, wherein the upper limit of the second differential pressure range is above 100 bar.

10. The pressure sensor of claim 9, wherein the upper limit of the second differential pressure range is above 500 bar.

11. The pressure sensor of claim 10, wherein the upper limit of the second differential pressure range is above 900 bar.

12. The pressure sensor of claim 1, wherein the measuring unit is further adapted to adjust the measurement of differential pressure by the differential pressure sensor on the basis of an absolute pressure measured by at least one of the first and second absolute pressure sensor.

13. The pressure sensor of claim 1, further comprising:
   a first pressure inlet for transmitting a pressure at a first inlet position to the first absolute pressure sensor and to a differential pressure sensor input and a second pressure inlet for transmitting a pressure at a second inlet position to the second absolute pressure sensor and to the other differential pressure sensor input, the first inlet position being spaced apart from the second inlet position.

14. The pressure sensor of claim 13, wherein the first pressure inlet is arrangeable at one side of an element selected from the group comprising a valve, a flow constriction, a filter element, a screen or a membrane and wherein the second pressure inlet is arrangeable at the other side of the element.

15. The pressure sensor of claim 1, wherein at least one of the first and the second absolute pressure sensor comprises a strain sensor coupled to a diaphragm as a sensor element for absolute pressure measurements.

16. An arrangement for measuring a pressure difference between a pressure at a first position and a pressure at a second position, comprising:
   the pressure sensor of claim 1; and
   a first section of piping providing a flow connection from the first position to a differential pressure sensor input and to the first absolute pressure sensor and a second section of piping providing a flow connection from the second position to the other differential pressure sensor input and to the second absolute pressure sensor.

17. The arrangement according to claim 16, further comprising a valve adapted to control the flow of a fluid through a duct, wherein the first section of piping is connected to the duct in a pressure-communicating manner on one side of the valve and the second section of piping is connected to the duct in a pressure-communicating manner on the other side of the valve.

18. A method of measuring differential pressure, comprising:
   measuring, in a first range of differential pressure, differential pressure via a differential pressure sensor; and
   determining, in a second range of differential pressure higher than the first range, differential pressure on the basis of absolute pressure measurements taken by a first absolute pressure sensor and a second absolute pressure sensor, wherein the differential pressure sensor comprises a differential pressure sensor element and a protection mechanism configured such that a differential pressure above the first pressure range is not transmitted to the sensor element.

19. The method of claim 18, further comprising:
   taking a differential pressure measurement in the first range via the differential pressure sensor; and
   calibrating said determination of differential pressure in the second range using said differential pressure measurement taken in the first range.

20. A pressure sensor, comprising:
   a differential pressure sensor adapted to measure differential pressure between two differential pressure sensor inputs in a first differential pressure range;
   a first absolute pressure sensor and a second absolute pressure sensor adapted to measure an absolute pressure in an absolute pressure range;
   a measuring unit configured to determine a differential pressure in a second differential pressure range on the basis of absolute pressure measurements taken by the first and second absolute pressure sensors; and
   a calibration unit configured to calibrate the determination of the differential pressure by the measuring unit, the calibration being based on a differential pressure measurement taken by the differential pressure sensor, wherein the first and second absolute pressure sensors are configured to have an absolute pressure range such that the second differential pressure range extends to relatively higher pressures than the first differential pressure range.

21. A method of measuring differential pressure, comprising:
   measuring, in a first range of differential pressure, differential pressure via a differential pressure sensor;
   determining, in a second range of differential pressure higher than the first range, differential pressure on the basis of absolute pressure measurements taken by a first absolute pressure sensor and a second absolute pressure sensor;
   taking a differential pressure measurement in the first range via the differential pressure sensor; and
   calibrating said determination of differential pressure in the second range using said differential pressure measurement taken in the first range.

* * * * *